July 22, 1969

G. C. T. DUVALET 3,457,411

INSTRUMENT FOR MEASURING ACTIVITY PER UNIT LENGTH OF
ELONGATED RADIATION EMITTING BODY

Filed March 21, 1967

United States Patent Office 3,457,411
Patented July 22, 1969

3,457,411
INSTRUMENT FOR MEASURING ACTIVITY PER UNIT LENGTH OF ELONGATED RADIATION EMITTING BODY
Gilbert Charles Theophile Duvalet, 24 Rue General du Bessol, Limoges, France
Filed Mar. 21, 1967, Ser. No. 624,769
Claims priority, application France, Apr. 27, 1966, 59,250
Int. Cl. G01n 23/00
U.S. Cl. 250—83.3    8 Claims

ABSTRACT OF THE DISCLOSURE

An instrument which measures the activity per unit length of a radiation emitting body of elongated shape. This instrument comprises a block of radiation-absorbent material provided with a passage therethrough and having two orifices. The passage has a dimension in the sense of orientation of the length of the radioactive body equal to the unit length. The block is provided with a housing recess opening into one of the orifices. The emitter body is arranged for exposure into the other of the orifices in a direction normal to the passage. Radiation detecting means are provided in the housing recess, and amplfying means, integrating means and display means are connected in series witth the detecting means.

---

In addition to the classic operations of clinical dosage metering, the use of artificial radioelements with a short half-life in interstitial radiotherapy imposes frequent activity measurements on practitioners. Among such radioelements, iridium 192 is available to radiotherapeutists in the form of wires exhibiting uniform activity per unit length.

It is the object of the present invention to permit direct, instantaneous readings of the measurements of the activity per unit length of radioelement wires. The invention accordingly provides an instrument or activity-meter for measuring the activity per unit length, that includes a device whereby a given length of activated wire can be placed before a gamma radiation detector and under identical geometrical conditions.

In a preferred form embodiment of the invention, this device consists of a block of material of large mass per unit volume which absorbs the radiation. This block is formed with a housing for receiving the radioactive wire and a cylindrical tunnel perpendicular to said housing and extending up to a sensitive face of a radiation detector, so that this tunnel collimates the radiation beam reaching the detector.

Preferably, said block is made of lead or steel, and preferably also the detector is a Geiger-Müller tube which may be placed in another housing in the block that intersects the tunnel.

If the detector is a Geiger-Müller tube, the latter delivers high-voltage pulses at high impedance at a continuously varying rate.

It is accordingly a further object of the invention to convert the pulses delivered by the detector into a current intensity or voltage proportional to the number of pulses. The number of electrical pulses delivered by the Geiger-Müller tube is itself proportional to the activity per unit length and can therefore be integrated by means of an electronic circuitry and transformed into a current intensity or voltage, the magnitude of which is a function of the number of pulses.

The present invention accordingly relates to electronic apparatus comprising, connected in series, a Geiger-Müller tube, a cathode follower stage, an amplitude limiter stage, an integrating detector, a direct current amplifier stage and a measuring instrument. The apparatus further includes power supply circuitry.

The main function of the cathode follower stage is to lower the impedance of the pulses, while the function of the amplitude limiter stage is to bring all these pulses to the same voltage regardless of their frequency, which is variable, for in order to ensure accurate measurements the integrating detector must be supplied with uniform signals.

The most important section of the apparatus is the integrating detector, for it is upon this unit that the sensitivity and fidelity of the instrument depends. In accordance with the present invention, therefore, the integrating circuit utilizes a resistance-capacitance circuitry the resistance of which can be varied—by the operation of a contact switch, for instance—the selected value being dependent on the source to be measured. To each resistance value of the integrating circuits corresponds a different reading scale on the measuring instrument, whereby the sensitivity of this instrument varies at the same time as the time constant of the integrating circuit. Likewise in accordance with this invention, adjustment of the integrating circuit and of the measuring instrument are controlled by one and the same means, an example being a contact switch that enables the measurement range to be changed without jeopardizing ultimate accuracy.

The characteristics of the component parts of the integrating detector are chosen according to the nature of the radiation detector and the detection units used, since the size and shape of both will vary according to the measurements to be made. It should be noted lastly that the overall sensitivity of the detection unit measuring instrument assembly will depend on the distance between the radioactive source and the radiation detector and also on the cross-section of the junction tunnel.

Furthermore, the function of the amplifier stage is to increase the sensitivity of the instrument and above all to provide the integrating detector with an invariable load circuit, irrespective of the chosen degree of sensitivity of the reading. The measuring instrument itself may be either a microammeter or a voltmeter.

With regard to the power supply, in accordance with the invention, it delivers an adjustable voltage for the radiation detector, a high fixed voltage for the cathode follower stage (thus permitting more extensive filtering) and a normal voltage for the remainder of the circuitry. It may additionally include, to that end, two transformers or a single specially wound transformer.

The description which follows with reference to the accompanying non-limitative exemplary drawings will give a clear understanding of how the invention can be carried into practice.

Figure 2:
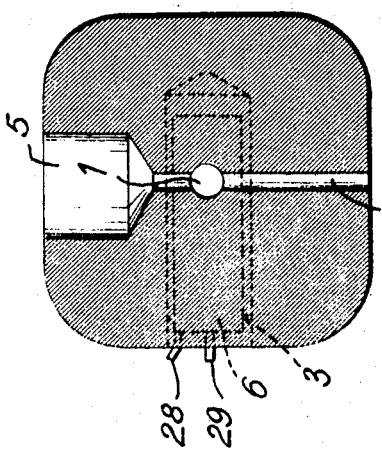
FIGURE 2 is a section taken on the line II—II of FIGURE 1.
Figure 1:
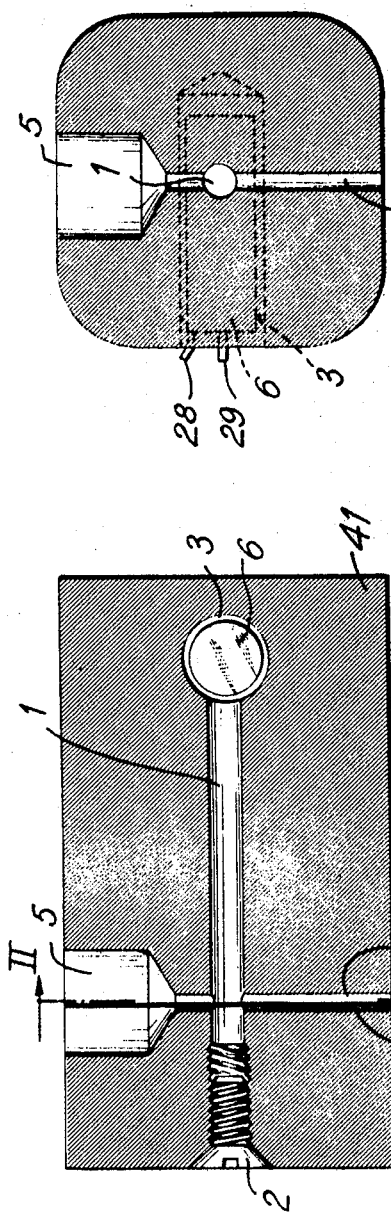
FIGURE 1 is a sectional view of detection unit according to the invention, on the plane containing the wire housing and the junction tunnel.

Referring first to FIGURES 1 and 2, the unit 41 shown thereon consists of a substantially rectangular block having formed therein, along one of its axes, a blind tunnel or diaphragming element 1, the opening into which can be closed by a screw 2 or by a cover and which extends into a housing 3 directed along a second axis and adapted to receive a Geiger-Müller tube. Formed in unit 41, along its third axis, is a narrow housing 4 which intersects tunnel 1 at a point adjacent the opening thereinto, in such manner that the distance separating this intersection from the housing be somewhat large. Housing 4 is formed at one of its ends with a flared portion 5 for facilitating insertion and retention of the radiation emitting wire or body of elongated shape 40 whose radioactivity is to be measured, said wire or body being inserted into a cylindrical guide.

Figure 3:
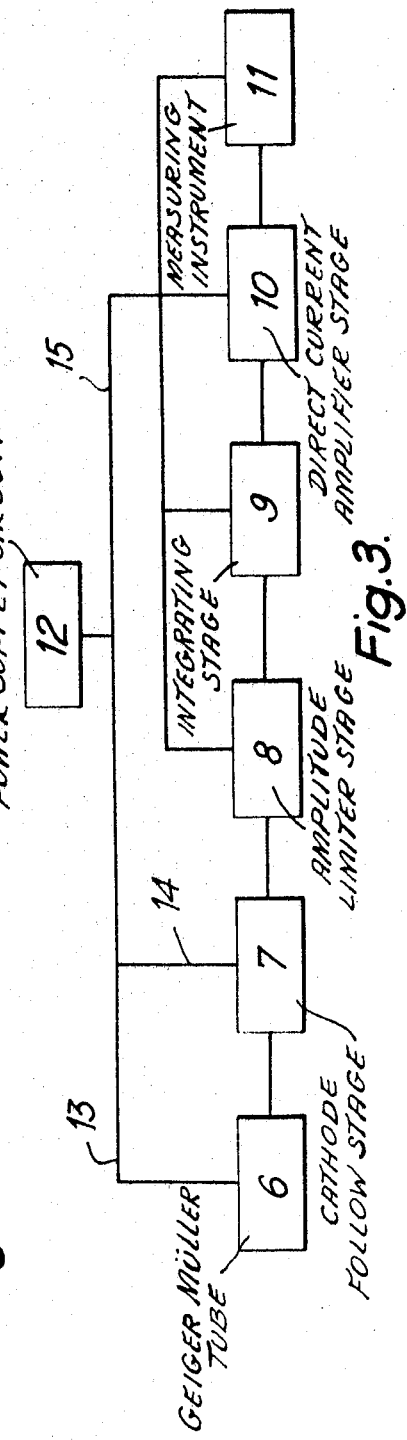
FIGURE 3 is a block diagram of the measuring instrument according to the invention.

As FIGURE 3 clearly shows, the measuring apparatus of the activity meter includes, connected in series at the output end of Geiger-Müller tube 6, a cathode follower stage 7, an amplitude limiter stage 8, an integrating stage 9, a direct current amplifier stage 10 and a measuring instrument 11. It further comprises a power supply circuit 12 which is connected, respectively, to Geiger-Müller tube 6 through a lead 13, to cathode follower stage 7 via a lead 14, and to amplitude limiter stage 8, integrating stage 9, amplifier stage 10 and measuring instrument 11 via a lead 15.

Figure 4:
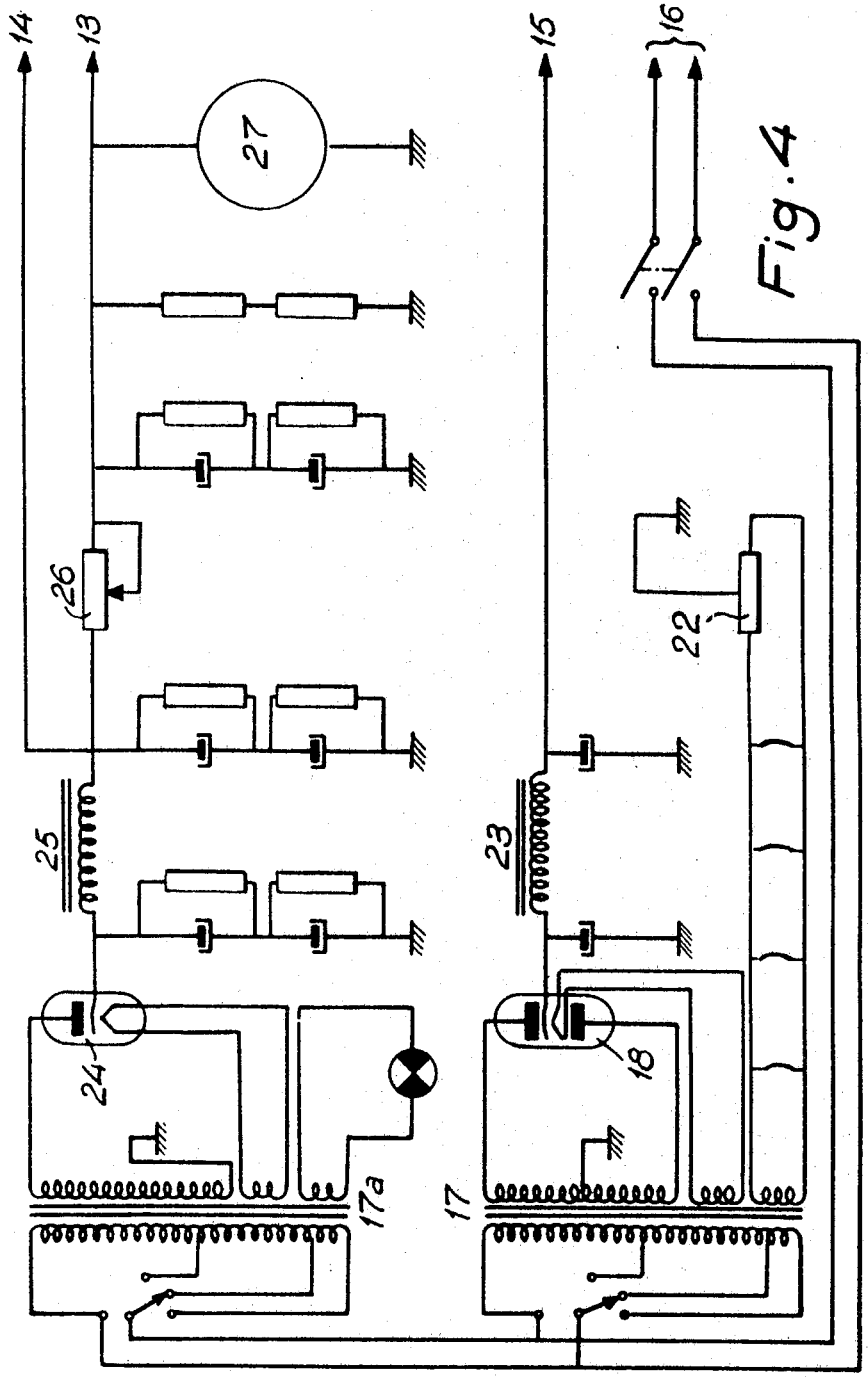
FIGURE 4 is a more detailed circuit diagram of the power supply section of the apparatus.

The power fed into the power supply circuit shown in FIGURE 4 is supplied by the mains 16 to the parallel-connected primary windings of two transformers 17 and 17a, each of these primary windings having a plurality of input terminals corresponding to the different line voltages used.

The secondary of transformer 17 comprises three windings, of which the first is used to heat the filament of a double rectifier diode 18, and the second feeds in parallel the filaments of two amplifier stage pentodes 19 and 20, of a cathode follower stage triode 30 and of an amplifier stage pentode 21; is a furthermore parallel-connected to an adjustable resistor 22 having its slide grounded. The third winding is grounded through its midpoint and its two parts respectively energize the two plates of double diode 18. The cathode of diode 18 is connected through a π-circuit 23 to feed channel 15, said π-circuit comprising an inductance coil and two capacitors and the characteristics of the elements being such that the voltage obtained at 15 is of the order of several hundred volts.

The secondary of transformer 17a likewise has three windings, the first of which is connected to a signal lamp and the second heats the filament of an indirectly heated diode 24 the anode of which is energized by the third of these windings. The cathode of diode 24 is connected through an inductance coil 25 to feed channel 14, and through an adjustment rheostat 26, to feed channel 13. The input to inductance coil 25, the output from rheostat 26, and the points separating the two are all grounded through the medium of two series-connected circuits each of which has a parallel resistance and capacitance. Shunted off channel 13 is a voltmeter 27 the input of which is also grounded. The voltage obtained at 14 is substantially double that obtained on channel 15.

Figure 5:
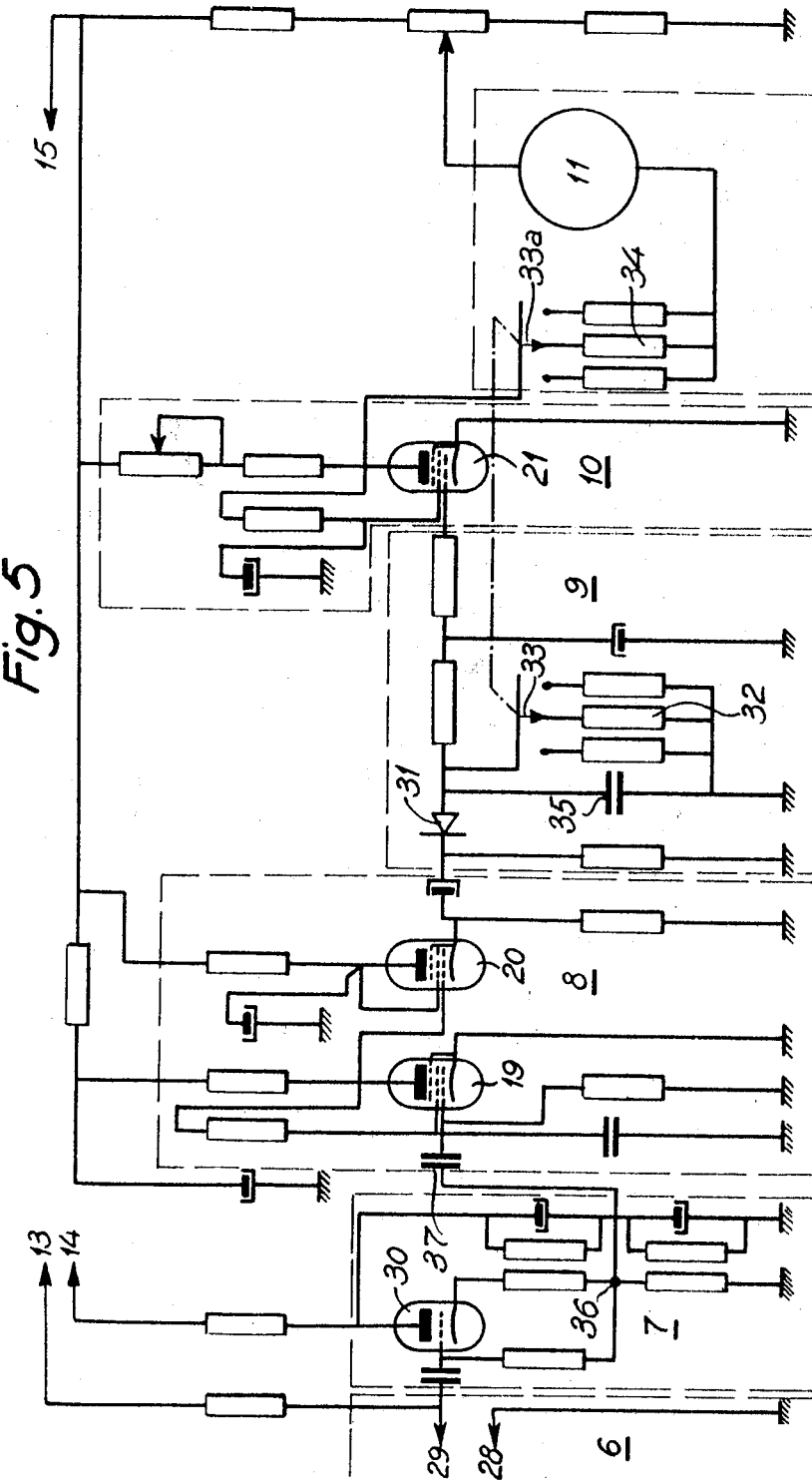
FIGURE 5 is a similarly detailed circuit diagram of the remainder of the apparatus.

Reference to FIGURE 5 shows that Geiger-Müller tube 6 has two terminals 28 and 29, the former being grounded and the latter being connected via a resistor to feed channel 13 and via an input capacitor to the grid of triode 30 of cathode follower stage 7.

The cathode of triode 30 is grounded via a plurality of resistors, and the plate of said triode is connected via a resistor to high-tension feed channel 14 and by-passed to ground via two series connected, paralleled-resistance-capacitance circuits. The grid of triode 30 is connected through a resistor to the midpoint 36 of the resistor-bridge used for grounding the triode cathode, said midpoint being in turn connected through an input capacitor 37 to the control grid of pentode 19. The low impedance output signal from cathode follower amplifier stage 7 is thus taken from the resistor-bridge and applied to the control grid of pentode 19 of amplitude limiter stage 8.

Inside amplitude limiter stage 8 the pentode 19 has its control grid grounded through a leakage resistor and its cathode and blocking grid grounded directly. The screen grid of pentode 19 is bypassed to ground via a capacitor and also connected to the plate via a resistor. Said plate is further connected to the control grid of pentode 20, while the plates of the two pentodes 19 and 20 are both connected through load resistors to the normal high tension feed channel 15. Pentode 20 has its plate bypassed to ground by a capacitor, its screen grid set at the plate potential and its cathode and blocking grid grounded through a resistor of value adapted to balance the circuitry of tubes 19 and 20 and connected to integrating stage 9 via a capacitor of somewhat high rating.

Integrating stage 9 includes, in series, a bypass grounded via a fixed resistor which determines the input impedance of the integrator, a rectifier 31, a bypass grounded through a parallel-connected capacitor 35 and resistor system 32, and two resistors separated by a bypass grounded through a capacitor. Through the medium of rectifier 31, capacitor 35 integrates the output signals from stage 8, while resistor system 32, which charges capacitor 35, determines the time constant of the integrator. The resistance 32 is selected from among a plurality of resistors by means of a contact switch or selector switch 33 whereby to determine the sensitivity of the instrument. This filter cell ensures a uniform, medium direct voltage.

The imput to voltage amplifier stage 10 is connected to integrator 9 and also to the control grid of pentode 21, which receives a negative voltage. Pentode 21 has its cathode and blocking grid grounded, and its screen grid is connected to its plate via a resistor which is by-passed to ground through a capacitor. The plate is connected, on one hand, to feed channel 15 via a fixed resistor is series with an adjustable resistor and, on the other, to a microammeter 11 through a resistor 34 which transmits the voltage read on said microammeter. This resistor is selected from among a plurality of resistors, whereby the resistance may be varied by means of a contact switch or selector switch 33a which is ganged with contact switch 33 in order that the sensitivity of the measuring system may vary with the time constant of the integrating circuit. The other terminal of microammeter 11 is connected to the slide of an adjustable resistor forming part of an adjustable-resistors bridge which is connected between ground and feed channel 15 and which permits adjustment of the voltage in the inoperative state.

Manifestly, many changes and substitutions may be made in the specific forms of embodiment hereinbefore described without departing from the spirit and scope of the invention. By way of example, a voltage regulator could be provided at the input end of the apparatus in place of the amplitude limiter stage. Further the use of a more sensitive measuring instrument would permit dispensing with the final amplifier stage.

What I claim is:

1. An instrument for measuring the activity per unit length of a radiation emitting body of elongated shape, comprising, in combination, a block of radiation-absorbent material provided with a passage therethrough and presenting two orifices, said passage having a dimension, in the sense of orientation of the length of said radioactive body, equal to said unit length, said block being provided with a housing recess opening into one of said orifices, said emitter body being arranged for exposure into the other of said orifices in a direction normal to said passage, radiation detecting means in said housing recess, and amplifying means, integrating means and display means connected in series with said detecting means.

2. An instrument for measuring the activity per unit length of a radiation emitting body of elongated shape, comprising, in combination, a block of radiation-absorbent material provided with a passage therethrough and presenting two orifices, said block being provided with a second housing recess adjacent the second of said orifices, said emitter body being, at least partially, accommodated in said second housing recess for exposure in a direction perpendicularly into said passage, radiation detecting means in said first housing recess, and amplifying means, integrating means and display means connected in series with said detecting means.

3. An instrument for measuring the activity per unit length of a radiation emitting body of elongated shape, comprising, in combination, a block of radiation-absorbent material provided with a passage therethrough and presenting two orifices, said block being provided with a housing recess adjacent one of said orifices, said emitter body being exposed into the other of said orifices in a direction perpendicular to said passage, radiation detecting means in said housing recess and amplifying means, integrating means and display means connected in series with said detecting means.

4. An instrument for measuring the activity per unit length of a radiation emitting body of elongated shape, comprising, in combination, a block of radiation-absorbent material provided with a cylindrical passage therethrough and presenting two orifices, said block being provided with a housing recess opening into one of said orifices, said emitter body being exposed into the other of said orifices in a direction perpendicular to said cylindrical passage, radiation detecting means in said housing recess, and amplifying means, integrating means and display means connected in series with said detecting means.

5. An instrument for measuring the activity per unit length of a radiation emitting body of elongated shape, comprising, in combination, a block of radiation-absorbent material provided with a passage therethrough and presenting two orifices, said block being provided with a housing recess opening into one of said orifices, said emitter body being exposed into the other of said orifices in a direction perpendicular to said passage, radiation detecting means in said housing recess, and amplifying means, pulse-regulating means, integrating means of the resistance-capacitance type and measuring means connected in series with said detecting means.

6. An instrument for measuring the activity per unit length of a radiation emitting body of elongated shape, comprising, in combination, a block of radiation-absorbent material provided with a passage therethrough and presenting two orifices, said block being provided with a housing recess opening into one of said orifices, said emitter body being exposed into the other of said orifices in a direction perpendicular to said passage, radiation detecting means in said housing recess, and a cathode follower stage, an amplitude-limiter stage, a D-C amplifier stage and measuring instrumentation connected in series with said detecting means.

7. An instrument according to claim 6 comprising in the electrical series an integrating means having variable resistance, the measuring instrumentation having a plurality of indicating scales corresponding to the number of resistances of the integrating means.

8. An instrument according to claim 7, wherein the measuring instrumentation includes a plurality of load resistors corresponding to the number of resistors in the integrating stage, and comprising a selector switch for the selection of said resistors.

References Cited

UNITED STATES PATENTS

| | | | |
|---|---|---|---|
| 2,974,231 | 3/1961 | Greenblatt et al. | 250—83.6 X |
| 3,040,175 | 6/1962 | Kern | 250—105 X |
| 3,254,214 | 5/1966 | Bennett | 250—83.6 X |

RALPH G. NILSON, Primary Examiner

A. B. CROFT, Assistant Examiner

U.S. Cl. X.R.

250—105